(12) United States Patent
Liu et al.

(10) Patent No.: US 7,495,899 B2
(45) Date of Patent: Feb. 24, 2009

(54) BATTERY COVER ASSEMBLY FOR PORTABLE ELECTRONIC DEVICE

(75) Inventors: Tai-Jun Liu, Shenzhen (CN); Ye Liu, Shenzhen (CN); Peng-Jin Ge, Shenzhen (CN); Rui-Hao Chen, Shenzhen (CN); Hsiao-Hua Tu, Tu-Cheng (TW); Chia-Hua Chen, Tu-Cheng (TW)

(73) Assignees: Shenzhen Futaihong Precision Industry Co., Ltd., ShenZhen, Guangdong Province (CN); Sutech Trading Limited, Tortola (VG)

( * ) Notice: Subject to any disclaimer, the term of this patent is extended or adjusted under 35 U.S.C. 154(b) by 523 days.

(21) Appl. No.: 11/305,384

(22) Filed: Dec. 16, 2005

(65) Prior Publication Data

US 2006/0139856 A1   Jun. 29, 2006

(30) Foreign Application Priority Data

Dec. 24, 2004   (CN)   ................. 2004 2 0103471

(51) Int. Cl.
G06F 1/16 (2006.01)
H05K 5/00 (2006.01)
H05K 7/00 (2006.01)

(52) U.S. Cl. ........................................ 361/683; 429/96
(58) Field of Classification Search ................. 361/683; 429/96, 97, 100; 455/575.1, 575.8
See application file for complete search history.

(56) References Cited

U.S. PATENT DOCUMENTS

| | | | | |
|---|---|---|---|---|
| 6,339,699 B1 * | 1/2002 | Hirai et al. | ............... | 455/575.1 |
| 6,568,956 B1 * | 5/2003 | Holmberg | ..................... | 429/97 |
| 6,929,878 B2 * | 8/2005 | Chen et al. | .................. | 429/100 |
| 7,068,495 B2 * | 6/2006 | Luo et al. | ...................... | 429/96 |
| 7,160,144 B2 * | 1/2007 | Nguyen et al. | ................ | 429/97 |
| 7,180,754 B2 * | 2/2007 | Qin et al. | ................. | 455/575.1 |
| 7,261,973 B2 * | 8/2007 | Tu et al. | ....................... | 429/97 |
| 2002/0076607 A1 * | 6/2002 | Chang | ......................... | 429/100 |
| 2004/0080916 A1 * | 4/2004 | Hsu et al. | ................... | 361/683 |
| 2004/0224220 A1 * | 11/2004 | Wang et al. | .................. | 429/96 |
| 2004/0229114 A1 * | 11/2004 | Liang et al. | ................ | 429/100 |
| 2005/0130029 A1 * | 6/2005 | Kim | ............................ | 429/97 |
| 2006/0126298 A1 * | 6/2006 | Liu et al. | .................... | 361/700 |
| 2006/0141344 A1 * | 6/2006 | Chen et al. | .................... | 429/97 |

* cited by examiner

Primary Examiner—Anatoly Vortman
Assistant Examiner—Adrian S Wilson

(57) ABSTRACT

A battery cover assembly includes a housing (1), a connecting member (20), a cover (3), a latching section (6), a compression spring (7), a gearing member (8), and a button (9). The housing has a sliding track (112) and a through hole (110) defined therein. The cover is rotatably engaged with the housing via the connecting member. The cover includes a claw (32) and a button hole (36). The latching section is slidably engaged with the housing. The latching section includes a stand arm (642) and a claw hole (622). The compression spring connects both with the housing and the latching section. The gearing member is mounted to the housing, and comprises a gear (81) and a rack (83) engaged with the gear. The rack defines a locking hole (830) engaging with the stand arm. The button engages with the gear and extends through the button hole.

18 Claims, 6 Drawing Sheets

BATTERY COVER ASSEMBLY FOR PORTABLE ELECTRONIC DEVICE

BACKGROUND OF THE INVENTION

1. Field of the Invention

The present invention generally relates to battery cover assemblies and, particularly, to a battery cover assembly for use in a portable electronic device.

2. Discussion of the Related Art

Batteries are widely used in portable electronic devices such as personal digital assistants (PDAs) and telephones. A battery is generally removably mounted in a receptacle of a housing of an electronic device. The receptacle is generally covered by a battery cover. When the battery is damaged or dead or needs to be recharged, the cover is removed from the housing, whereupon the battery can be taken out and replaced.

A fixing mechanism is generally employed in a conventional battery cover, to engage with a housing of the portable electronic device. For example, a battery cover of an Alcatel® OT310 telephone includes a fixing mechanism. The fixing mechanism incorporates a pair of hooks arranged at a lower end of the battery cover and a locking pin arranged at an upper end of the battery cover. Correspondingly, a pair of slots is defined at a lower end of a backside of the housing, and a locking hole is defined at an upper end of the back side. In assembly, the hooks are inserted into the corresponding slots. Then, the battery cover is pressed downwardly such that the locking pins of the battery cover are inserted into the corresponding locking holes of the housing. The battery cover is thus assembled to the housing of the telephone. The battery cover is simple in structure, and the engagement between the battery cover and the housing of the telephone is secure. However, during disassembly of the cover from the housing of the telephone, the battery cover is liable to be damaged because a fairly large force has to be exerted on the battery cover to detach the battery cover from the housing. As a result, it can be inconvenient for a user to change a battery.

What is needed, therefore, is a new battery cover assembly for a portable electronic device, which makes it convenient for a user to detach a battery cover from a housing of the portable electronic device.

SUMMARY OF THE INVENTION

In a preferred embodiment, a battery cover assembly, configured for use in a portable electronic device, includes a housing, a connecting member, a cover, a latching section, a compression spring, a gearing member, and a button. The housing has a sliding track and a through hole defined therein. The cover is rotatably engaged with the housing via the connecting member. The cover includes a claw and a button hole. The latching section is slidably engaged with the housing. The latching section includes a stand arm inserted through the sliding track of the housing and a claw hole engagingly corresponding with the claw of the cover. The compression spring connects both with the housing and the latching section. The gearing member is mounted to the housing and includes a gear and a rack engaged with the gear. The rack defines a locking hole corresponding to and engaging with the stand arm of the latching section. The button engages with the gear, and extends through the button hole of the cover.

A main advantage of the above-described battery cover assembly is that the button is exposed to an outside through the button hole of the cover, and thus the cover can be released from the housing easily and conveniently just by turning the button. The cover is thus convenient for a user to operate.

Other advantages and novel features of preferred embodiments of the present battery cover assembly system and its applications will become more apparent from the following detailed description when taken in conjunction with the accompanying drawings.

BRIEF DESCRIPTION OF THE DRAWINGS

Many aspects of the present battery cover assembly for portable electronic device and their applications can be better understood with reference to the following drawings. The components in the drawings are not necessarily to scale, the emphasis instead being placed upon clearly illustrating the principles of the battery cover assembly for portable electronic device. Moreover, in the drawings, like reference numerals designate corresponding parts throughout the several views.

DETAILED DESCRIPTION OF PREFERRED EMBODIMENTS

The present battery cover assembly 10 is suitable for portable electronic devices such as mobile phones, PDAs and so on having a separable component like a battery or a battery module.

Figure 1:
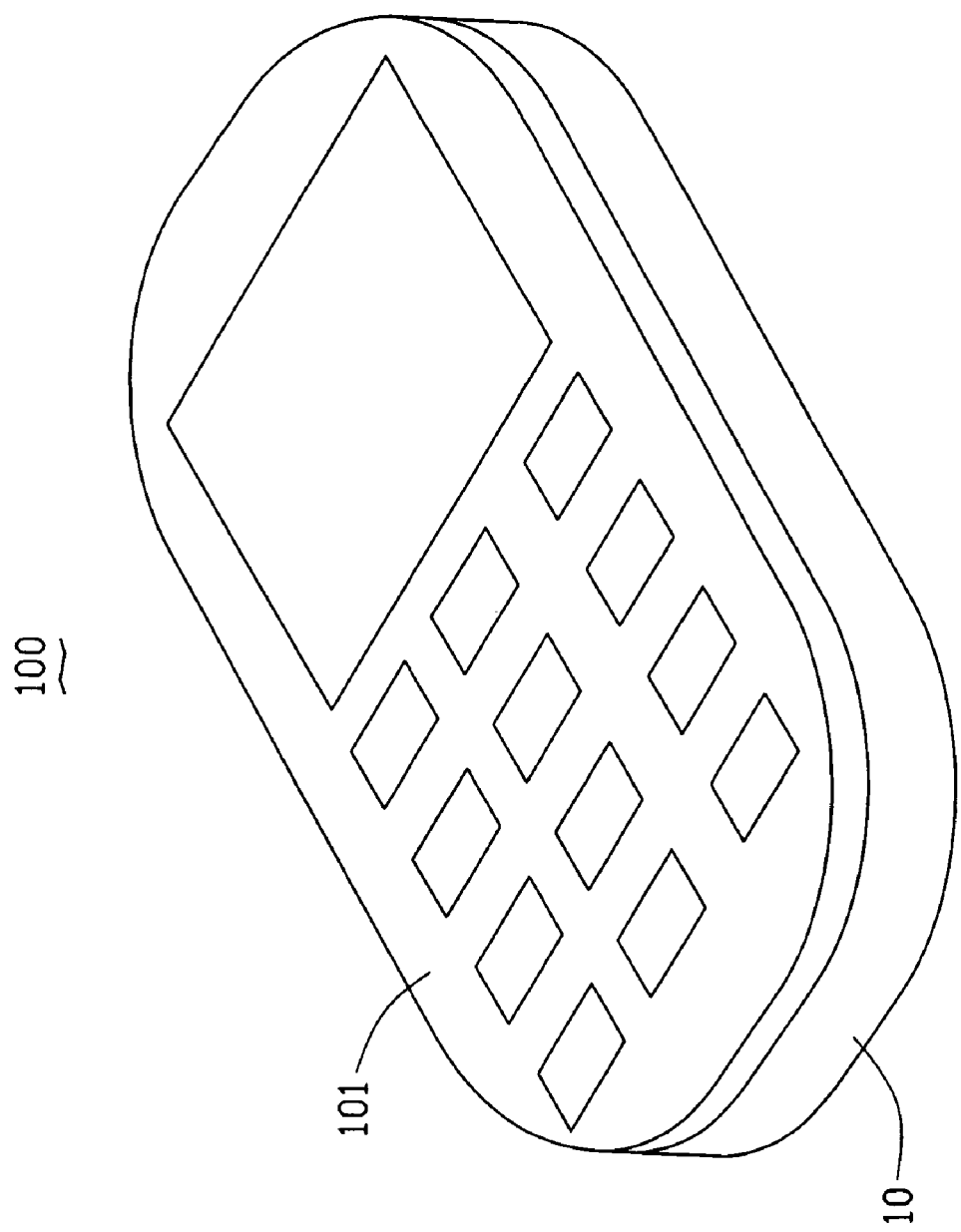
FIG. 1 is an isometric view of a mobile phone including a main housing and a battery cover assembly, in accordance with a preferred embodiment of the present battery cover assembly.
Figure 2:
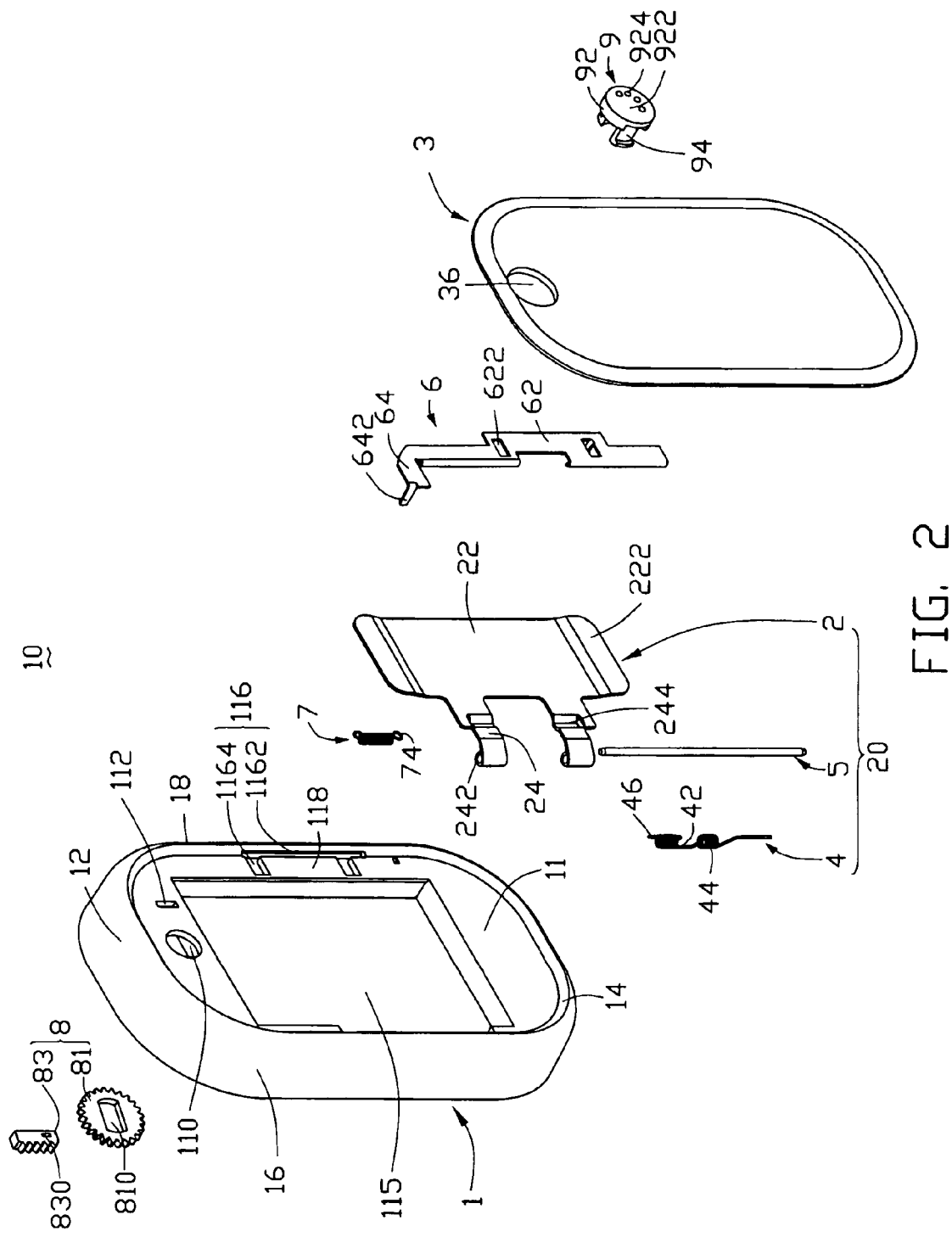
FIG. 2 is an exploded, isometric view of a battery cover assembly in accordance with a preferred embodiment.
Figure 3:
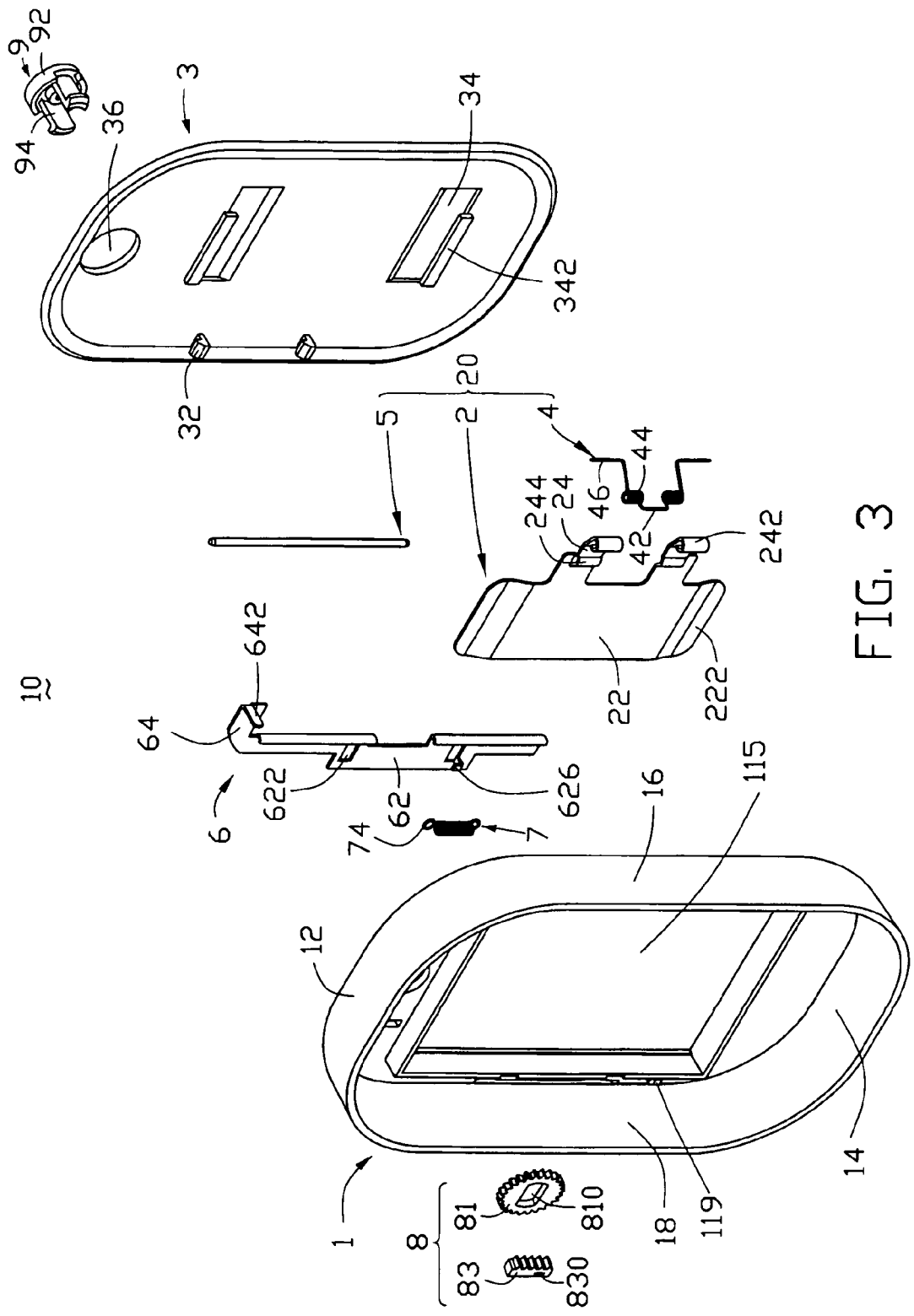
FIG. 3 is similar to FIG. 2, but viewed from another aspect.
Figure 4:
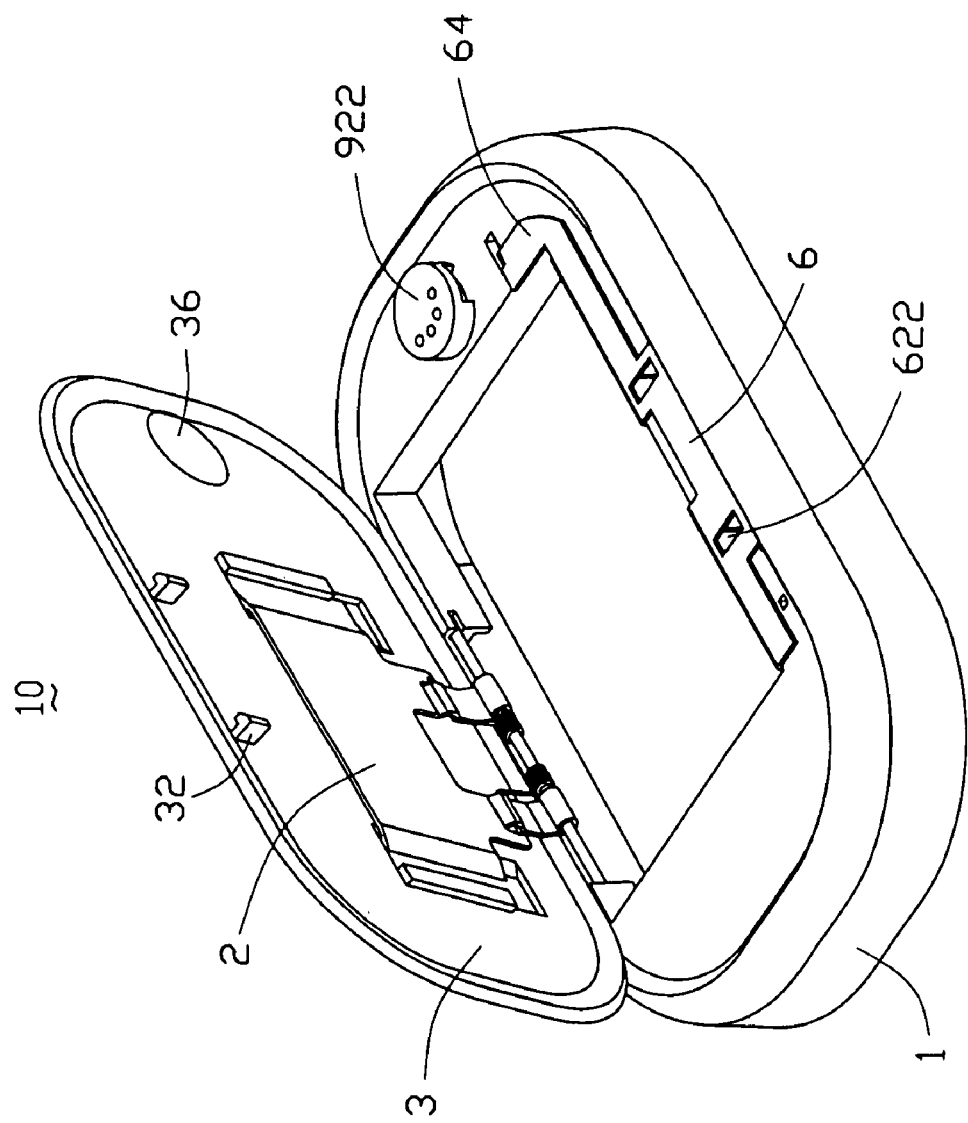
FIG. 4 is an assembled view of the battery cover assembly shown in FIG. 2.
Figure 5:
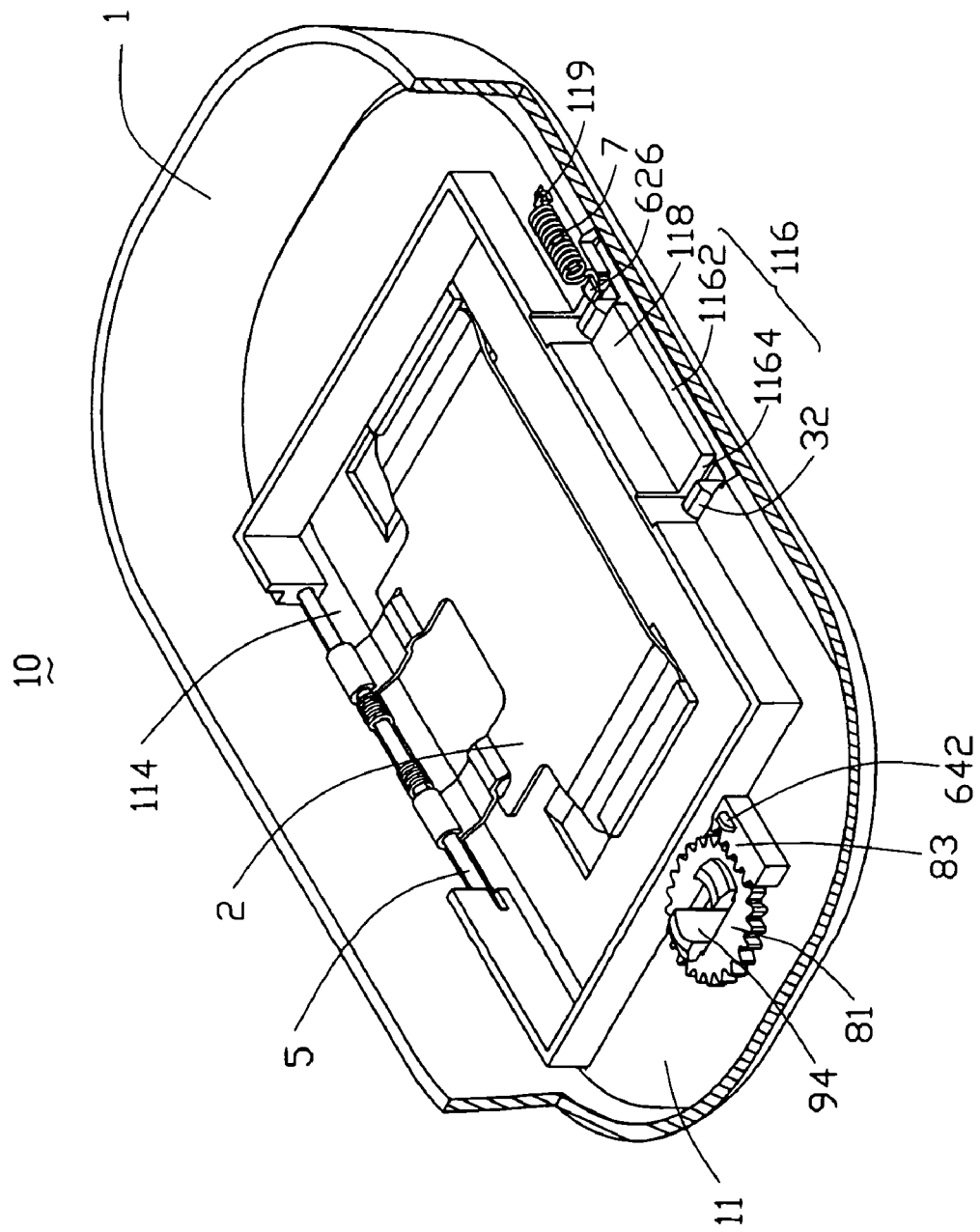
FIG. 5 is an assembled, partially cut-away view of the battery cover assembly shown in FIG. 2.
Figure 6:
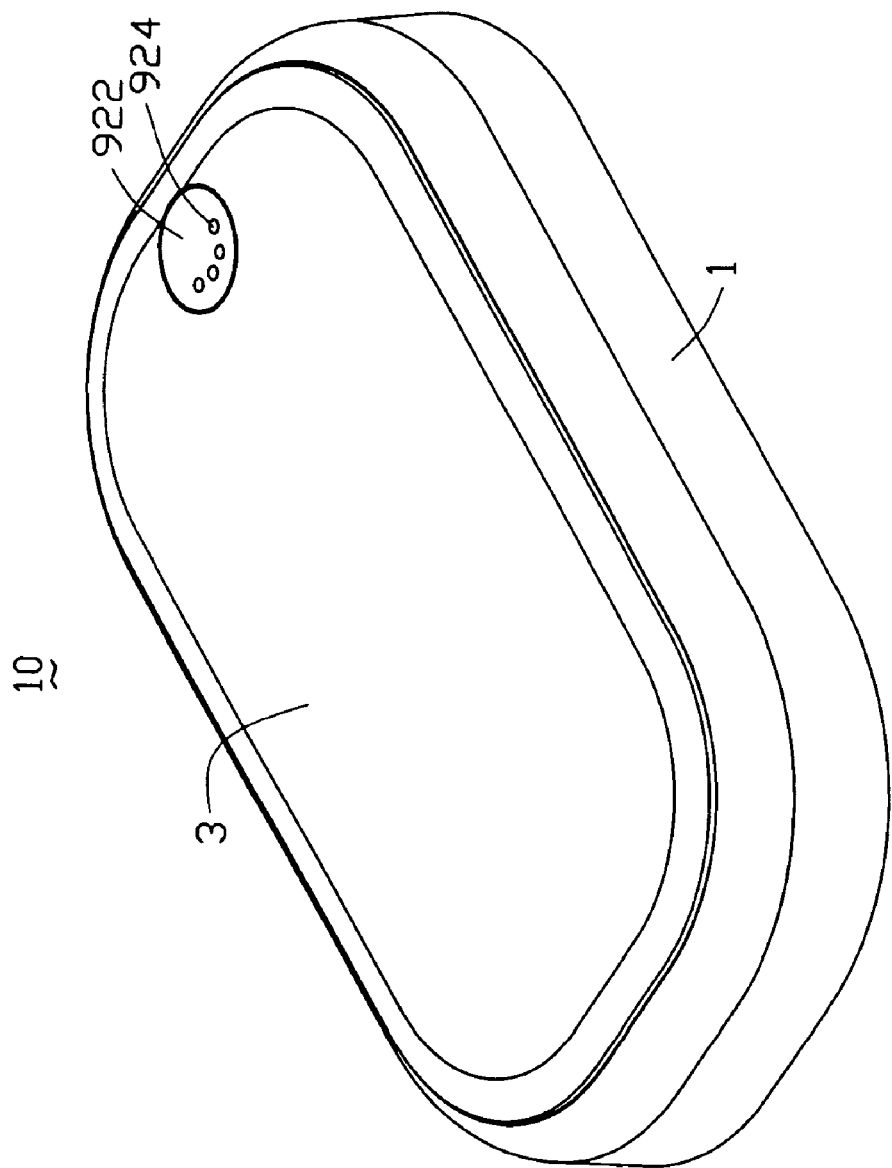
FIG. 6 is similar to FIG. 5, but representing a full, assembled view, taken from another aspect.

Referring now to the drawings in detail, FIGS. 2-6 show a battery cover assembly 10 for use in a mobile phone 100 (shown in FIG. 1) according to a preferred embodiment. The mobile phone 100 is taken here as an exemplary application, for the purposes of describing details of the battery cover assembly 10. Referring to FIG. 1, the mobile phone 100 includes a main housing or console 101 and the battery cover assembly 10 attached to each other to commonly define a space for receiving a plurality of electronic components, such as a printed circuit board, a battery and so on, therein. Referring to FIGS. 2-6, the battery cover assembly 10 includes a housing 1, a connecting member 20, a removable battery cover 3, a latching section 6, a compression spring 7, a gearing member 8, and a button 9. The connecting member 20 includes a connecting piece 2, a torsion spring 4, and a shaft 5.

The housing 1 includes a top wall 12, a bottom wall 14, a left sidewall 16, and a right sidewall 18, which together define a substantially rectangular space. The housing 1 further includes a main partition wall 11, which is peripherally surrounded by the top wall 12, the bottom wall 14, the left sidewall 16 and the right side wall 18. The partition wall 11 separates a first compartment (not labeled) from an opposite second compartment (not labeled). The first compartment is used to receive other electronic components, such as a printed circuit board, therein. This compartmentalizing is achieved when the housing 1 is assembled with the main housing 101 of the mobile phone 100. The second compartment is used to engagingly receive the cover 3.

A recess 115 is defined in a middle portion of the partition wall 11. The recess 115 is used to receive a battery. A through hole 110 and a sliding track 112 are both defined in the partition wall 11 adjacent the top wall 12, and the sliding track 112 is also adjacent the right sidewall 18. A containing portion 114 is provided in the partition wall 11 adjacent the left sidewall 16. A U-shaped compounding groove 116 is located in the partition wall 11, adjacent the right sidewall 18. The compounding groove 116 includes two opposite side grooves 1164 and a transverse groove 1162 perpendicularly interconnecting the side grooves 1164. Thereby, an apron 118 is formed between the transverse groove 1162 and the two side grooves 1164. In the first compartment, a first clasp 119 is disposed on the partition wall 11, adjacent the right sidewall 18 and the bottom wall 14.

The connecting piece 2 is made of elastic sheet material. The connecting piece 2 includes a main body 22 and a pair of symmetrically bent portions 24. The main body 22 is substantially a rectangular plate and includes two opposite long sides and two opposite short sides. A pair of symmetrically sliding sections 222 is bent appreciably from the two short sides, respectively The bent portions 24 extend from the long side of the main body 22. A curled portion 242 is formed at one end of each bent portion 24. A catching portion 244 is formed between each bent portion 24 and the main body 22.

The cover 3 can be formed from a single piece of shaped sheet material, and the cover 3 further has an inner surface 30. A pair of symmetrical claws 32 extends from the inner surface 30 at a peripheral portion of the cover 3. A pair of symmetrical concavities (e.g., impressions/indentations) 34 is defined in a middle portion of the inner surface 30 of the cover 3, and a length of each concavity 34 is larger than that of the sliding section 222 of the connecting piece 2. A pair of symmetrical, elastic ribs 342 is disposed on the inner surface 30 of the cover 3, adjacent the concavities 34. Each rib 342 and a corresponding concavity 34 forms a sliding groove, and each sliding section 222 of the connecting piece 2 is slidably engaged in a corresponding sliding groove. A button hole 36 is defined in the cover 3. A diameter of the button hole 36 is slightly larger than that of the through hole 110 of the housing 1.

The torsion spring 4 includes a fixing portion 42, two column portions 44, and two locking ends 46. The two column portions 44 symmetrically extend from two ends of the fixing portion 42, respectively, and the two locking ends 46 symmetrically extend from the column portions 44, respectively. The locking ends 46 are engaged with the catching portions 244 of the connecting piece 2, respectively.

The shaft 5 is a generally thin, long cylinder. A diameter of the shaft 5 is slightly smaller than that of the curled portions 242 of the connecting piece 2 and the column portions 44 of the torsion spring 4, thereby facilitating a close clearance fit of the shaft 5 with such portions 44, 242.

The latching section 6 includes a body 62 and an arm 64 spanning from the body 62. A pair of symmetrical claw holes 622 is defined in the body 62, and the claws 32 of the cover 3 interlock with the claw holes 622. A second clasp 626 is disposed in the body 62, adjacent one claw hole 622 far apart from the arm 64. A stand arm 642 extends perpendicularly from the arm 64, and the stand arm 642 is movably engaged in the locking hole 112 of the housing 1.

The compression spring 7 is helical and preferably metallic. The compression spring 7 has two hooks 74, one at each end thereof. One hook 74 operatively connects with the first clasp 119 of the housing 1, and the other hook 74 does so with the second clasp 626 of the latching section 6.

The gearing member 8 includes a gear 81 and a rack 83. The gear 81 defines a rectangular hole 82 therein. The gear 81 has a diameter larger than that of the through hole 110 of the housing 1. The rack 83 is engaged with the gear 81. The rack 83 defines a locking hole 830, which is aligned with the sliding track 112 of the housing 1. The locking hole 830 has a profile slightly smaller than that of the stand arm 642 of the latching section 6.

The button 9 is made of elastic material and has a main portion 92 and a pair of L-shaped cantilevers 94. The main portion 92 is a generally circular body and has a main surface 922. A plurality of protuberances 924 is disposed on the main surface 922, in order to increase the friction between the main portion 92 and a fingertip of a user to facilitate the release of the cover 3. The pair of L-shaped cantilevers 94 symmetrically extends from an opposite surface of the main portion 92. A diameter of the main portion 92 is slightly larger than that of the through hole 110 of the housing 1, and is slightly smaller than that of the button hole 36 of the cover 3.

In assembly, firstly, the sliding sections 222 of the connecting piece 2 are forced to slide, respectively, into the sliding grooves formed by the ribs 342 and the concavities 34 of the cover 3. Thus, the connecting piece 2 is slidably mounted to the cover 3. Secondly, the shaft 5 is inserted through one curled portion 242 of the connecting piece 2, the column portions 44 of the torsion spring 4, and the other curled portion 242 of the connecting piece 2. The locking ends 46 of the torsion spring 4 are received in the catching portions 244 of the connecting piece 2, respectively. Then, the shaft 5, together with the connecting piece 2, the cover 3, and the torsion spring 4, is mounted to the containing portion 114 of the housing 1 at the second compartment, and the fixing portion 42 of the torsion spring 4 resists the left sidewall 16 of the housing 1. Thirdly, the latching section 6 is mounted to the partition wall 11 of the housing 1, adjacent the right sidewall 18 at the second compartment. The claw holes 622 of the latching section 6 are respectively aligned with the side grooves 1164 of the latching section 6, while the second clasp 626 and the stand arm 642 of the latching section 6 are respectively inserted through the side groove 1164, near the bottom wall 14 and the sliding track 112 of the housing 1. Fourthly, the rack 83 of the gearing member 8 is located at the partition wall 11 of the housing 1, in the first compartment. The stand arm 642 of the latching section 6 is engaged with the locking hole 830 of the rack 83. Thereby, the rack 83 is fixed to the latching section 6. An end of the stand arm 642, sticking out of the locking hole 830, is bent perpendicularly in order to lock the rack 83. Then, the cantilevers 94 of the button 9 are forced to insert through the through hole 110 of the housing 1 and the rectangular hole 810 of the gear 8. The gear 81 is thereby mounted to the housing 1, engaging with the rack 83. At last, the compression spring 7 is mounted to the housing 1, and the hooks 74 of the compression spring 7 are, respectively, inserted in the first clasp 119 of the housing 1 and the second clasp 626 of the latching section 6. The battery cover assembly 10 is thus completely assembled.

When the cover 3 needs to be closed to the housing 1, the cover 3 and, jointly, the shaft 5 are manually rotated toward the housing 1. The claws 32 of the cover 3 engage with the claw holes 622 of the latching section 6, respectively. The torsion spring 4 is twisted when the cover 3 is closed down onto the housing 1, and the torsion spring 4 thereby exhibits a torsional force. During the above-described closing processes of the cover 3, the compression spring 7 is utilized to exert a contraction force to the second clasp 626 of the latching section 6, and, thereby, the second clasp 626 of the latching section 6 becomes engaged with an edge of the side groove 1164. The main surface 922 of the button 9 protrudes from the cover 3 and is exposed to a user. The cover 3 is thus closed to the housing 1.

When the cover 3 needs to be opened, the button 9 is rotated by the user. Thus, the gear 81 of the gearing member 8 is jointly rotated and forces the rack 83 to move. The movement of the rack 83 jointly moves the stand arm 642 and the latching section 6, of which the stand arm 642 is a part, and, as such, the claws 32 of the cover 3 are disengaged from the claw holes 622 of the latching section 6. The cover 3 is automatically rotated away the housing 1 by the force generated by the untwisting of the torsion spring 4. The cover 3 is thus opened from the housing 1. At the same time, the compression spring 7 rebounds/contracts, causing the latching section 6 to return to its original position relative to the housing 1.

In alternative embodiments, the compression spring 7 can be made of nonmetallic material such as plastic. Further, the compression spring 7 can instead be another kind of elastic means known in the art, such as a resilient cylinder. The torsion spring 4 can be omitted, with the cover 3 being manually rotated away the housing 1 when the claws 32 of the cover 3 disengage from the claw holes 622 of the latching section 6.

It is believed that the embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

We claim:

1. A battery cover assembly for use in a portable electronic device, comprising:
   a housing having a sliding track and a through hole defined therein;
   a connecting member;
   a cover rotatably engaged with the housing via the connecting member, the cover comprising at least one claw and a button hole;
   a latching section slidably engaged with the housing, the latching section comprising a stand arm and at least one claw hole, the stand arm being inserted through the sliding track of the housing, each claw hole engageably corresponding with a corresponding claw of the cover;
   a compression spring connecting both with the housing and the latching section;
   a gearing member mounted to the housing, the gearing member comprising a gear and a rack engaged with the gear, the rack defining a locking hole corresponding to and engaged with the stand arm of the latching section; and
   a button engaging with the gear and extending through the button hole of the cover.

2. The battery cover assembly as claimed in claim 1, wherein the connecting member comprises a connecting piece and a shaft, the connecting piece comprising at least one curled portion and at least sliding section, the shaft being received in each curled portion of the connecting piece, and each end of the shaft extending through each curled portion.

3. The battery cover assembly as claimed in claim 2, wherein the connecting piece has a catching portion connecting each curled portion with the connecting piece.

4. The battery cover assembly as claimed in claim 3, wherein the connecting member further comprises a torsion spring, the torsion spring comprising a fixing portion, a pair of column portions, and two locking ends, the fixing portion having two fixing ends, the pair of column portions, respectively, extending from the corresponding two fixing ends of the fixing portion, the two locking ends symmetrically extending, respectively, from the corresponding column portions, the two locking ends being respectively engaged with the catching portions of the connecting piece.

5. The battery cover assembly as claimed in claim 1, wherein the button has a main portion and a plurality of cantilevers, the main portion of the button having a main surface, the main surface having a plurality of protuberances defined thereon, the cantilevers extending from the main portion opposite the main surface thereof, the cantilevers being L-shaped.

6. The battery cover assembly as claimed in claim 1, wherein the latching section further comprises a main body and an arm, the arm extending from the main body, the stand arm being bent perpendicularly from the arm, each claw hole being defined in the main body, the latching section further comprising a clasp engaged with one end of the compression spring.

7. The battery cover assembly as claimed in claim 6, wherein the housing further comprises another clasp engaged with the other end of the compression spring, the housing further having a side groove formed therein, the side groove corresponding with a corresponding claw hole of the latching section.

8. The battery cover assembly as claimed in claim 2, wherein the housing further comprises a containing portion to engage with the shaft.

9. The battery cover assembly as claimed in claim 2, wherein the cover defines a concavity and an elastic rib, with the rib and the concavity forming a sliding groove to receive the sliding section of the connecting piece.

10. A portable electronic device, comprising:
    a main console configured for carrying at least one operative component of the portable electronic device; and
    a battery cover assembly configured for carrying a battery, the battery being configured for supplying power to each operative component of the portable electronic device, the battery cover assembly comprising:
    a housing attached to the main console and having a sliding track and a through hole defined therein;
    a connecting member;
    a cover rotatably engaged with the housing via the connecting member, the cover comprising at least one claw and a button hole;
    a latching section slidably engaged with the housing, the latching section comprising a stand arm and at least one claw hole, the stand arm being inserted through the sliding track of the housing, each claw hole engageably corresponding with a corresponding claw of the cover;
    a compression spring connecting both with the housing and the latching section;
    a gearing member mounted to the housing, the gearing member comprising a gear and a rack engaged with the gear, the rack defining a locking hole corresponding to and engaged with the stand arm of the latching section; and
    a button engaging with the gear, and extending through the button hole of the cover.

11. The portable electronic device as claimed in claim 10, wherein the connecting member comprises a connecting piece and a shaft, the connecting piece comprising at least one curled portion and at least sliding section, the shaft being received in each curled portion of the connecting piece, and each end of the shaft extending through each curled portion.

12. The portable electronic device as claimed in claim 11, wherein the connecting piece has a catching portion connecting each curled portion with the connecting piece.

13. The portable electronic device as claimed in claim 12, wherein the connecting member further comprises a torsion spring, the torsion spring comprising a fixing portion, a pair of column portions, and two locking ends, the fixing portion having two fixing ends, the pair of column portions, respectively, extending from the corresponding two fixing ends of the fixing portion, the two locking ends symmetrically extending, respectively, from the corresponding column portions, the two locking ends being respectively engaged with the catching portions of the connecting piece.

14. The portable electronic device as claimed in claim 10, wherein the button has a main portion and a plurality of cantilevers, the main portion of the button having a main surface, the main surface having a plurality of protuberances defined thereon, the cantilevers extending from the main portion opposite the main surface thereof, the cantilevers being L-shaped.

15. The portable electronic device as claimed in claim 10, wherein the latching section further comprises a main body and an arm, the arm extending from the main body, the stand arm being bent perpendicularly from the arm, each claw hole being defined in the main body, the latching section further comprising a clasp engaged with one end of the compression spring.

16. The portable electronic device as claimed in claim 15, wherein the housing further comprises another clasp engaged with the other end of the compression spring, the housing further having a side groove formed therein, the side groove corresponding with a corresponding claw hole of the latching section.

17. The portable electronic device as claimed in claim 11, wherein the housing further comprises a containing portion to engage with the shaft.

18. The portable electronic device as claimed in claim 11, wherein the cover defines a concavity and an elastic rib, with the rib and the concavity forming a sliding groove to receive the sliding section of the connecting piece.

* * * * *